United States Patent [19]

Heyman

[11] Patent Number: 4,641,870
[45] Date of Patent: Feb. 10, 1987

[54] BUMPER GUARD

[76] Inventor: Neal R. Heyman, 11313 W. Country View Dr., Mequon, Wis. 53092

[21] Appl. No.: 796,251

[22] Filed: Nov. 8, 1985

[51] Int. Cl.⁴ .............................................. B60R 19/02
[52] U.S. Cl. .................................................... 293/102
[58] Field of Search ................... 293/102, 48, 24, 115, 293/126

[56] References Cited

U.S. PATENT DOCUMENTS 2,354,700  8/1944  Pezzano ............................ 293/48
3,552,514  1/1971  Alpers .............................. 293/102
3,726,556  4/1973  West ................................ 293/48

Primary Examiner—Robert R. Song
Attorney, Agent, or Firm—Fuller, Puerner & Hohenfeldt, S.C.

[57] ABSTRACT

A body guard is especially useful for protecting the front end of a Corvette automobile. The guard is comprised of an appropriately shaped and padded angle iron that covers the front end. The guard is held in place by a pair of brackets that extend downwardly in front of the grille to an elbow and then upwardly from the elbow to a location on the automobile frame under the automobile body having pre-existing holes for attaching the brackets to the frame. The bracket elbows lie closer to the pavement than designated body parts. Thus, the elbows will contact a parking curb and warn the driver thereof before the designated strike and are damaged by the obstruction.

10 Claims, 4 Drawing Figures

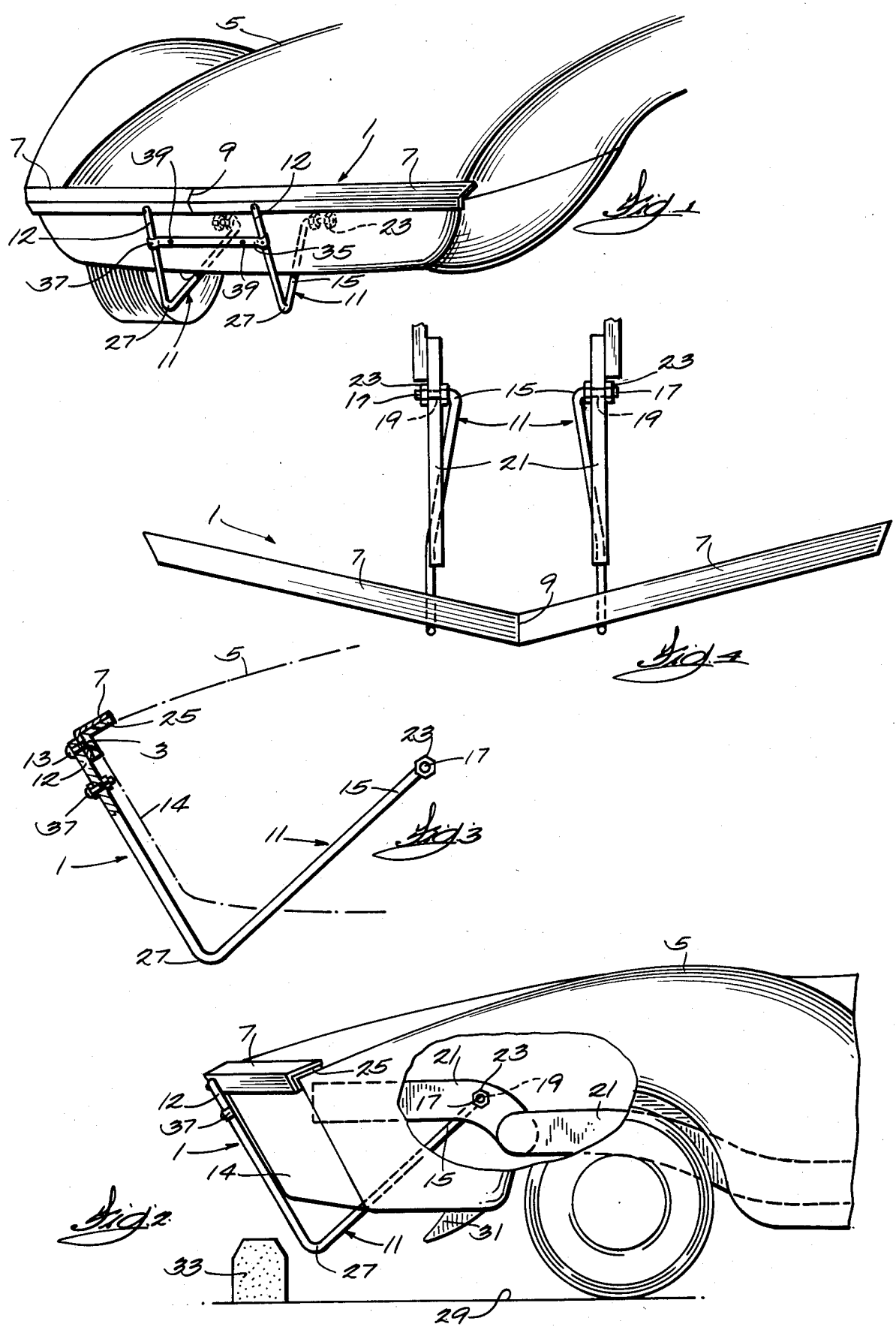

BUMPER GUARD

BACKGROUND OF THE INVENTION

1. Field of the Invention. This invention pertains to protective apparatus for automobiles, and more particularly to apparatus for protecting Corvette automobile body members from damage.

2. Description of the Prior Art. It is well known that the front end of Corvette automobiles is very susceptible to damage. That is true to a large extent because Corvettes do not have front bumpers as are used in most other automobile models. It is further well known that repairing even relatively minor dents and scratches in Corvette bodies is very expensive.

An available device for reducing the danger of Corvette front end damage is an electrically powered alarm system manufactured by Protech Engineering Co. of Port Washington, New York. That device includes spring steel rods that are mounted a few inches from the front end of the automobile body. The spring steel rods serve as a trigger for activating the automobile horn when the rods are disturbed. Thus, the driver of another vehicle approaching a Corvette equipped with the protective device will be warned of an impending collision. However, the other driver may not have sufficient time to react before his car strikes the Corvette, and thus the collision will occur despite the audio warning.

Automobile bumper extensions and similar protective devices are well known. Examples of such apparatus may be seen in U.S. Pat. Nos. 1,293,224; 1,515,567; 1,610,516; 1,623,404; 3,081,119; and 4,076,295. However, the various devices disclosed in the cited patents are not suitable for automobiles such as Corvettes, which lack the conventional front bumper found on most automobiles.

Thus, a need exists for a guard for a Corvette automobile that protects the front end from collision damage.

SUMMARY OF THE INVENTION

In accordance with the present invention, a protection bumper is provided which greatly reduces the occurrence of minor dents and scratches in the front end of Corvette automobiles. This is accomplished by apparatus that includes a protective angle iron shaped to fit over the protruding ridge that forms the foremost portion of the Corvette body.

The angle iron is held in place by a pair of brackets. One end of each bracket is attached under the automobile to an appropriate frame member under the car. The brackets extend forwardly from the frame member in a generally downward direction and then curve upwardly in front of the automobile grille. The second end of each bracket is attached to the angle iron guard.

The brackets are formed with elbows that clear the pavement by only a few inches. Accordingly, the elbows will strike a curb or similar obstacle and thus assist in parking the automobile without damaging other body components having road clearances less than the height the curb.

The brackets are joined near the second ends thereof by a strut. The strut increases the rigidity of the brackets and also serves as a holder for the license plate. The angle iron is padded, so that it does not scratch the automobile, and further so that blows to the angle iron are absorbed without damage to the automobile body.

Other objects, advantages, and features of the invention will become apparent from the disclosure.

BRIEF DESCRIPTION OF THE DRAWINGS

FIG. 1 is a perspective view of the front end of a Corvette automobile with the bumper guard of the present invention in place thereon;

FIG. 2 is a partially broken side view of the automobile with the bumper guard of the present invention in place thereon;

FIG. 3 is a side view partially in section, of the bumper guard of the present invention; and FIG. 4 is a top view of the bumper guard of the present invention.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIGS. 1–4, a bumper guard is illustrated that includes the present invention. The bumper guard is particularly useful for protecting the ridge 3 that forms the foremost portion of a Corvette automobile 5. However, it will be understood that the invention is not limited to automotive applications.

The bumper guard 1 comprises a pair of symmetrical angle irons 7 that are joined, as by welding, at junction 9. The angle irons 7 are joined to create a shallow V-shape that conforms to the contour of the ridge 3. The included angle between the two angle irons may thus be about 145 degrees.

To hold the angle irons 7 on the automobile ridge 3, a pair of allochiral brackets 11 are attached at the outside ends 12 thereof to the angle irons by conventional fasteners 13. The brackets 11 extend from the angle irons downward and rearwardly in front of the automobile grille 14 to elbows 27, and then upwardly and rearwardly under the automobile 5. The inside ends 15 of the brackets are fabricated with threaded end fingers 17. The brackets are dimensioned such that the end fingers 17 are insertable through existing holes 19 in frame members 21 of the automobile. Conventional nuts 23 may be used to hold the bracket ends 15 to the frame 21.

To further protect the body ridge 3, the inside surfaces of the angle irons 7 are provided with a padding 25. Thus, no damage to the automobile body will occur from an impact to the angle irons.

Further in accordance with the present invention, the bracket elbows 27 are located closer to the pavement 29 than other low-lying body members, such as scoop 31. The elbows will thus strike a curb 33 or other obstruction as the automobile is being parked. The driver will thereby be warned of the obstruction in time to stop and protect the scoop 31 and similar parts from damage by the curb 33. A preferred included angle for the elbow is about 70 degrees.

Referring to FIG. 1, the outside ends 12 of the brackets 11 are joined by a strut 35, as by fasteners 37. The strut 35 increases the rigidity of the bumper guard 1. Further, the strut serves as a mounting member for the automobile license plate, not shown. For that purpose, the strut is pierced with a pair of appropriately spaced holes 39 for accepting the license plate mounting screws.

The simplicity of the bumper guard 1 renders it very easy to install and remove from the Corvette automobile 5. Consequently, the bumper guard can be quickly and conveniently removed for car shows and rallies, and then replaced for ordinary street use.

The preferred material for the angle irons 7 is stainless steel, because that material does not rust in outdoor use. The preferred angle iron size is about 1½ inches by 2 inches by 14 gauge. The brackets 11 are preferably made of 0.5 inch diameter cold-rolled steel.

It will be appreciated that different model Corvettes may have different designs for the frame 21 and the location of the holes 19. Accordingly, the brackets 11 may deviate slightly from the configuration shown in FIGS. 1-4.

Thus, it is apparent that there has been provided in accordance with the invention a bumper guard that satisfies the objects, aims and advantages set forth above. While the invention has been in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A bumper guard for protecting a selected portion of an automobile body comprising guard means for covering the selected portion of the automobile body and shaped complementary to the automobile body; and bracket means attached to the automobile frame for holding the guard means in position on the selected portion of the automobile body, and wherein the guard means comprises a V-shaped angle iron adapted to fit over the selected portion of the automobile body and wherein the guard means further comprises a padding secured to the angle iron for interposition between the angle iron and automobile body to thereby protectively separate the angle iron from the automobile body.

2. A bumper guard for protecting a selected portion of an automobile body comprising guard means for covering the selected portion of the automobile body and shaped complementary to the automobile body; and bracket means attached to the automobile frame for holding the guard means in position on the selected portion of the automobile body, said bracket means including a pair of allochiral brackets, each having an outside end adapted to be fastened to the guard means and an inside end adapted to be fastened to the automobile frame; and fastener means for fastening the bracket outside ends to the guard means and for fastening the inside ends to the automobile frame and wherein the inside end of each bracket is formed with a finger adapted to be inserted through a cooperating hole in the automobile frame.

3. A bumper guard for protecting a selected portion of an automobile body comprising guard means for covering the selected portion of the automobile body and shaped complementary to the automobile body; and bracket means attached to the automobile frame for holding the guard means in position on the selected portion of the automobile body, said bracket means including a pair of allochiral brackets, each having an outside end adapted to be fastened to the guard means and an inside end adapted to be fastened to the automobile frame; and fastener means for fastening the bracket outside ends to the guard means and for fastening the inside ends to the automobile frame and wherein the bracket means further comprises a strut joined to the brackets near the outside ends thereof and adapted to receive an automobile license plate thereon.

4. The bumper guard of claim 2 wherein the brackets are formed with elbows between the inside and outside ends.

5. The bumper guard of claim 4 wherein the bracket elbows define an included angle of about 7 degrees.

6. In combination with a Corvette auto, a bumper guard for protecting the ridge that forms the foremost portion of the automobile body comprising:
   a. an angle iron means for covering the automobile body ridge;
   b. padding means secured to the angle iron means for interposition between the angle iron means and the automobile body ridge; and
   c. bracket means for holding the angle iron means in place on the automobile body ridge.

7. The combination of claim 6 wherein the bracket means comprises:
   a. a pair of allochiral brackets, each bracket having an outside end fastened to the angle iron means and an inside end fastened to the automobile frame under the auto; and
   b. fastener means for fastening the bracket outside ends to the angle iron means and for fastening the inside ends to the automobile frame.

8. The combination of claim 7 wherein the inside end of each bracket is formed with a finger adapted to be inserted through a cooperating hole in the automobile frame.

9. The combination of claim 7 wherein:
   a. each bracket is formed with an elbow between the outside and inside ends; and
   b. the brackets extend from the outside ends thereof downwardly and rearwardly in front of the automobile grille to the elbows and upwardly and rearwardly from the elbows to the inside ends, the fingers of the inside ends being inserted through the cooperating holes in the frame under the automobile body for fastening thereto.

10. The combination of claim 9 wherein the bracket elbows lie closer to the pavement than designated automobile body parts,
   so that the bracket elbows strike an obstruction and thereby protect the designated parts from damage.

* * * * *